US009036309B2

(12) United States Patent
Roscoe et al.

(10) Patent No.: US 9,036,309 B2
(45) Date of Patent: May 19, 2015

(54) ELECTRODE AND PLASMA GUN CONFIGURATION FOR USE WITH A CIRCUIT PROTECTION DEVICE

(75) Inventors: George William Roscoe, Atlanta, GA (US); Dean Arthur Robarge, Southington, CT (US); Robert Joseph Caggiano, Wolcott, CT (US); Seth Adam Cutler, Middletown, CT (US); Thangavelu Asokan, Bangalore (IN); Adnan Kutubuddin Bohori, Bangalore (IN)

(73) Assignee: General Electric Company, Schenectady, NY (US)

( * ) Notice: Subject to any disclaimer, the term of this patent is extended or adjusted under 35 U.S.C. 154(b) by 1281 days.

(21) Appl. No.: 12/883,419

(22) Filed: Sep. 16, 2010

(65) Prior Publication Data

US 2012/0068602 A1 Mar. 22, 2012

(51) Int. Cl.

| | |
|---|---|
| ***H02H 3/00*** | (2006.01) |
| ***H02H 7/00*** | (2006.01) |
| ***H01T 2/02*** | (2006.01) |
| ***H01T 1/00*** | (2006.01) |
| ***H01T 21/06*** | (2006.01) |
| ***H05H 1/52*** | (2006.01) |

(52) U.S. Cl.

CPC ............. *H01T 2/02* (2013.01); *Y10T 29/49117* (2015.01); *H01T 1/00* (2013.01); *H01T 21/06* (2013.01); *H05H 1/52* (2013.01)

(58) Field of Classification Search

CPC ............... H01T 1/20; H01T 2/00; H01T 2/02; H01T 4/20; H01T 21/06; H02H 1/0015; H02H 9/041

USPC .................. 361/128, 129, 2–13; 218/17, 156; 219/121.48, 121, 52

See application file for complete search history.

(56) References Cited

U.S. PATENT DOCUMENTS

| | | |
|---|---|---|
| 4,521,666 A | 6/1985 | Severance, Jr. et al. |
| 4,904,838 A | 2/1990 | Szantho et al. |
| 4,959,520 A | 9/1990 | Okada et al. |
| 5,124,525 A | 6/1992 | Severance, Jr. et al. |
| 5,308,949 A | 5/1994 | Reed, Jr. et al. |
| 5,317,126 A | 5/1994 | Couch, Jr. et al. |
| 6,040,548 A | 3/2000 | Siniaguine |
| 6,096,992 A | 8/2000 | Severance, Jr. |
| 6,121,571 A | 9/2000 | Siniaguine et al. |

(Continued)

FOREIGN PATENT DOCUMENTS

| | | |
|---|---|---|
| CN | 101291561 A | 10/2008 |
| CN | 101640406 A | 2/2010 |

(Continued)

OTHER PUBLICATIONS

Search Report and Written Opinion from EP Application No. 11181254.1 dated Jan. 24, 2014.

*Primary Examiner* — Thienvu Tran
*Assistant Examiner* — Christopher Clark
(74) *Attorney, Agent, or Firm* — General Electric Company

(57) ABSTRACT

A circuit protection device includes a plasma gun configured to emit an ablative plasma along an axis, and a plurality of electrodes, wherein each electrode is electrically coupled to a respective conductor of a circuit and is arranged substantially along a plane that is substantially perpendicular to the axis such that each electrode is positioned substantially equidistant from the axis.

20 Claims, 13 Drawing Sheets

(56) References Cited

U.S. PATENT DOCUMENTS

| | | | | |
|---|---|---|---|---|
| 6,278,241 | B1 | 8/2001 | Enguelcht et al. | |
| 7,281,478 | B2 | 10/2007 | Wang et al. | |
| 8,330,069 | B2 * | 12/2012 | Cutler et al. | 219/121.48 |
| 2008/0094612 | A1 | 4/2008 | Land | |
| 2008/0239598 | A1 * | 10/2008 | Asokan et al. | 361/56 |
| 2009/0010299 | A1 | 1/2009 | Kummer et al. | |
| 2009/0308845 | A1 * | 12/2009 | Bohori et al. | 218/157 |
| 2012/0063036 | A1 * | 3/2012 | Robarge et al. | 361/2 |

FOREIGN PATENT DOCUMENTS

| | | | |
|---|---|---|---|
| CN | 101828432 | A | 9/2010 |
| EP | 525404 | B1 | 8/1994 |
| EP | 2066154 | A2 | 6/2009 |
| EP | 2133966 | A2 | 12/2009 |
| EP | 2161801 | A2 | 3/2010 |
| GB | 195453 | A | 3/1923 |
| JP | 2298791 | A | 12/1990 |

* cited by examiner

ELECTRODE AND PLASMA GUN CONFIGURATION FOR USE WITH A CIRCUIT PROTECTION DEVICE

BACKGROUND OF THE INVENTION

The embodiments described herein relate generally to power equipment protection devices and, more particularly, to apparatus that include adjustable electrode assemblies and an ablative plasma gun for use in eliminating arc flashes.

Known electric power circuits and switchgear generally have conductors that are separated by insulation, such as air, or gas or solid dielectrics. However, if the conductors are positioned too closely together, or if a voltage between the conductors exceeds the insulative properties of the insulation between the conductors, an arc can occur. The insulation between the conductors can become ionized, which makes the insulation conductive and enables formation of an arc flash.

An arc flash is caused by a rapid release of energy due to a fault between two phase conductors, between a phase conductor and a neutral conductor, or between a phase conductor and a ground point. Arc flash temperatures can reach or exceed 20,000° C., which can vaporize the conductors and adjacent equipment. Moreover, an arc flash can release significant energy in the form of heat, intense light, pressure waves, and/or sound waves, sufficient to damage the conductors and adjacent equipment. However, the current level of a fault that generates an arc flash is generally less than the current level of a short circuit, such that a circuit breaker may not trip or exhibits a delayed trip unless the circuit breaker is specifically designed to handle an arc fault condition. Although agencies and standards exist to regulate arc flash issues by mandating the use of personal protective clothing and equipment, there is no device established by regulation that eliminates arc flash.

Standard circuit protection devices, such as fuses and circuit breakers, generally do not react quickly enough to mitigate an arc flash. One known circuit protection device that exhibits a sufficiently rapid response is an electrical "crowbar," which utilizes a mechanical and/or electro-mechanical process by intentionally creating an electrical "short circuit" to divert the electrical energy away from the arc flash point. Such an intentional short circuit fault is then cleared by tripping a fuse or a circuit breaker. However, the intentional short circuit fault created using a crowbar may allow significant levels of current to flow through adjacent electrical equipment, thereby still enabling damage to the equipment.

Another known circuit protection device that exhibits a sufficiently rapid response is an arc containment device, which creates a contained arc to divert the electrical energy away from the arc flash point. Such known devices generally include two or more main electrodes separated by a gap of air. Moreover, each main electrode is threaded directly into a corresponding electrode holder. These electrodes cause electrical energy to concentrate at the interface point with the electrode holder, i.e., at the thread, which creates a structurally weak point that can cause failure during use. Moreover, this concentration of energy at the interface point can cause the electrode to become welded or melted to the electrode holder, which requires replacement of both the electrode and the electrode holder after use. Furthermore, because of tolerances in the manufacture of such threaded electrodes, it can be difficult to position these electrodes to obtain consistent results.

During operation, a bias voltage is applied to the main electrodes across the gap. However, at least some known electric arc devices require the main electrodes to be positioned closely together to obtain desired operation. Contaminants, or even the natural impedance of the air in the gap, can lead to arc formation between the main electrodes at undesirable times, which can lead to a circuit breaker being tripped when it would be otherwise unnecessary. Accordingly, at least some known electric arc devices simply position the main electrodes further apart to avoid such false positive results. However, these devices are typically less reliable because of a less effective spread of plasma from a plasma gun. For example, at least some known plasma guns provide a plasma spread that does not effectively promote effective dielectric breakdown and reduction of impedance in the gap of air between the main electrodes. Such plasma guns can therefore show a lower level of reliability.

BRIEF DESCRIPTION OF THE INVENTION

In one aspect, a circuit protection device includes a plasma gun configured to emit an ablative plasma along an axis, and a plurality of electrodes, wherein each electrode is electrically coupled to a respective conductor of a circuit, and the electrodes are arranged substantially along a plane perpendicular to the axis such that each electrode is positioned substantially equidistant from the axis.

In another aspect, an arc initiation system is provided for use with a circuit protection device. The arc initiation system includes a controller configured to detect an arc event in a circuit and initiate an arc within the circuit protection device, a plasma gun operatively coupled to the controller and configured to emit an ablative plasma along an axis, and a plurality of electrodes. Each electrode is electrically coupled to a respective conductor of the circuit is arranged substantially along a plane that is substantially perpendicular to the axis such that the electrodes are substantially equidistant from each other.

In another aspect, a method is provided for assembling a circuit protection device. The method includes coupling each of a plurality of electrodes to a different portion of an electrical circuit, positioning an ablative plasma gun that is configured to emit an ablative plasma along an axis, and adjusting a position of each of the electrodes in one of a first direction and an opposite second direction along a plane that is substantially perpendicular to the axis such that each of the electrodes is positioned substantially equidistant from the axis.

DETAILED DESCRIPTION OF THE INVENTION

Exemplary embodiments of apparatus and methods of assembly for use with a circuit protection device are described hereinabove. These embodiments facilitate adjusting a distance between electrodes in a circuit protection device, such as an arc containment device. Adjusting the distance, or air gap, between the electrodes enables an operator to setup the circuit protection device in a manner that best suits the environment in which the circuit protection device is to be used. For example, the distance between the electrodes may be set based on the system voltage. Moreover, the embodiments described herein enable replacement of the electrodes after use, which are among the lowest-cost elements of the circuit protection system.

In addition, these embodiments provide an ablative plasma gun that includes a chamber having a first portion, or lower portion, having a first volume that is defined by a first diameter, and a second portion, or upper portion, having second volume that is defined by a second diameter that is larger than the first diameter. This plasma gun design facilitates an increased reliability and enhances plasma breakdown and arc creation between main electrodes of an arc elimination system. For example, the embodiments described herein provide a greater plasma spread after the arc is created between the main electrodes, which facilitates enhanced dielectric breakdown within a main gap between the main electrodes. The additional plasma spread and dielectric breakdown enable the arc elimination system to perform under a wider range of bias voltages between the main electrodes, including bias voltages as low as 200 volts, and at a wider range of impedances within the main gap.

Figure 1:
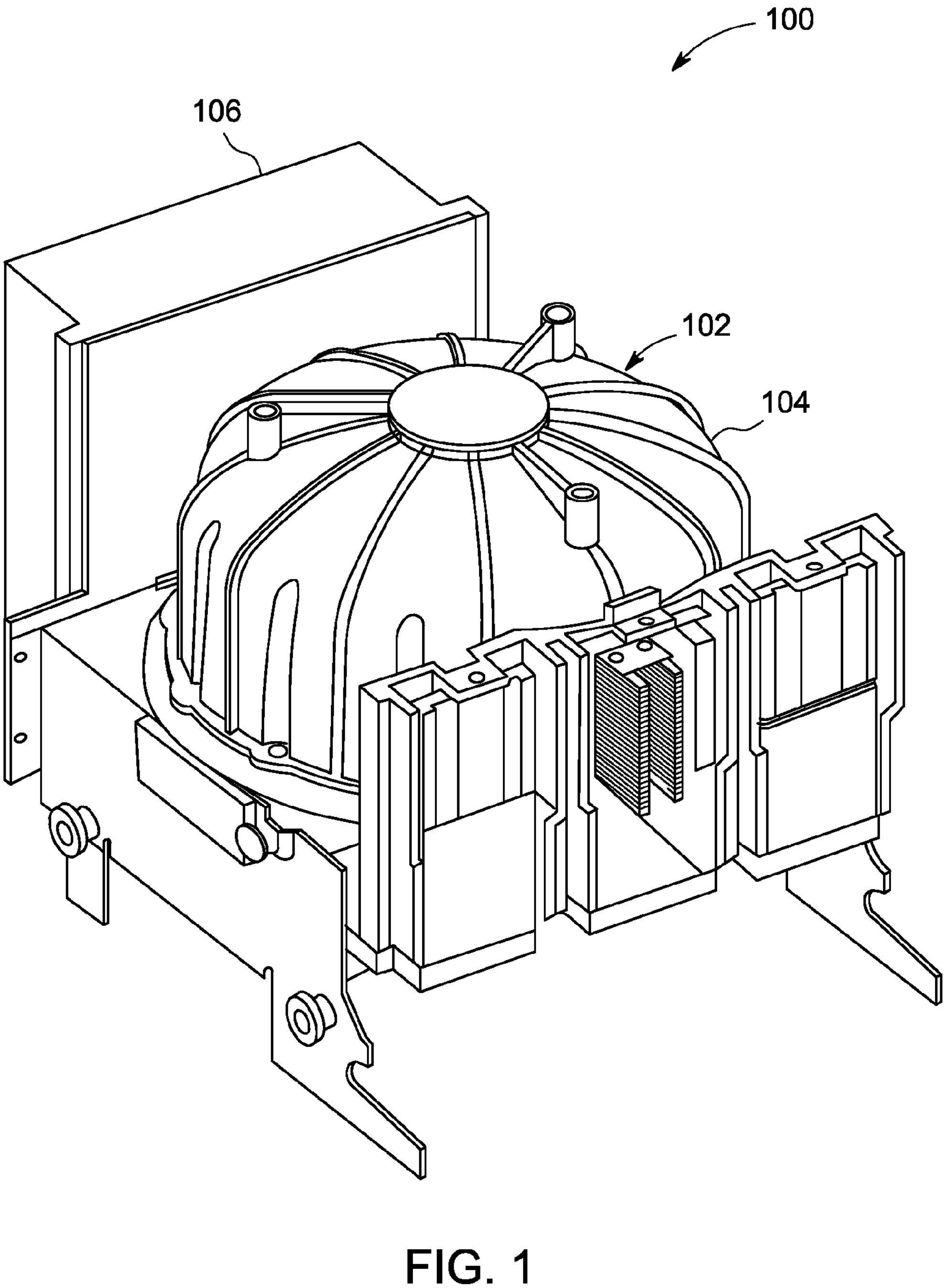
FIG. 1 is a perspective view of an exemplary circuit protection device.

FIG. 1 is a perspective view of an exemplary circuit protection device 100 for use in protection of a circuit (not shown) that includes a plurality of conductors (not shown). More specifically, circuit protection device 100 may be used for protection of power distribution equipment (not shown). In the exemplary embodiment of FIG. 1, circuit protection device 100 includes a containment section 102 having an outer shell 104, and a controller 106 that is coupled to containment section 102. The term "controller," as used herein, refers generally to any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term "controller."

During operation, controller 106 receives signals from one or more sensors (not shown) for use in detecting an arc flash within an equipment enclosure (not shown). The sensor signals may correspond with current measurements through one or more conductors of the circuit, voltage measurements across conductors of the circuit, light measurements in one or more areas of the equipment enclosure, circuit breaker settings or statuses, sensitivity settings, and/or any other suitable sensor signal that indicates an operation status or operating data relating to the power distribution equipment. Controller 106 determines whether an arc flash is occurring or is about to occur based on the sensor signals. If an arc flash is occurring or is about to occur, controller 106 initiates a contained arc flash within containment section 102 and transmits a signal to, for example, a circuit breaker, that is electrically coupled to the circuit at risk of the arc flash. In response to the signal, a plasma gun (not shown) emits an ablative plasma substantially along an axis between a plurality of electrodes (not shown in FIG. 1) to facilitate creation of the contained arc. The contained arc enables the excess energy to be removed from the circuit to protect the circuit and any power distribution equipment.

Figure 2:
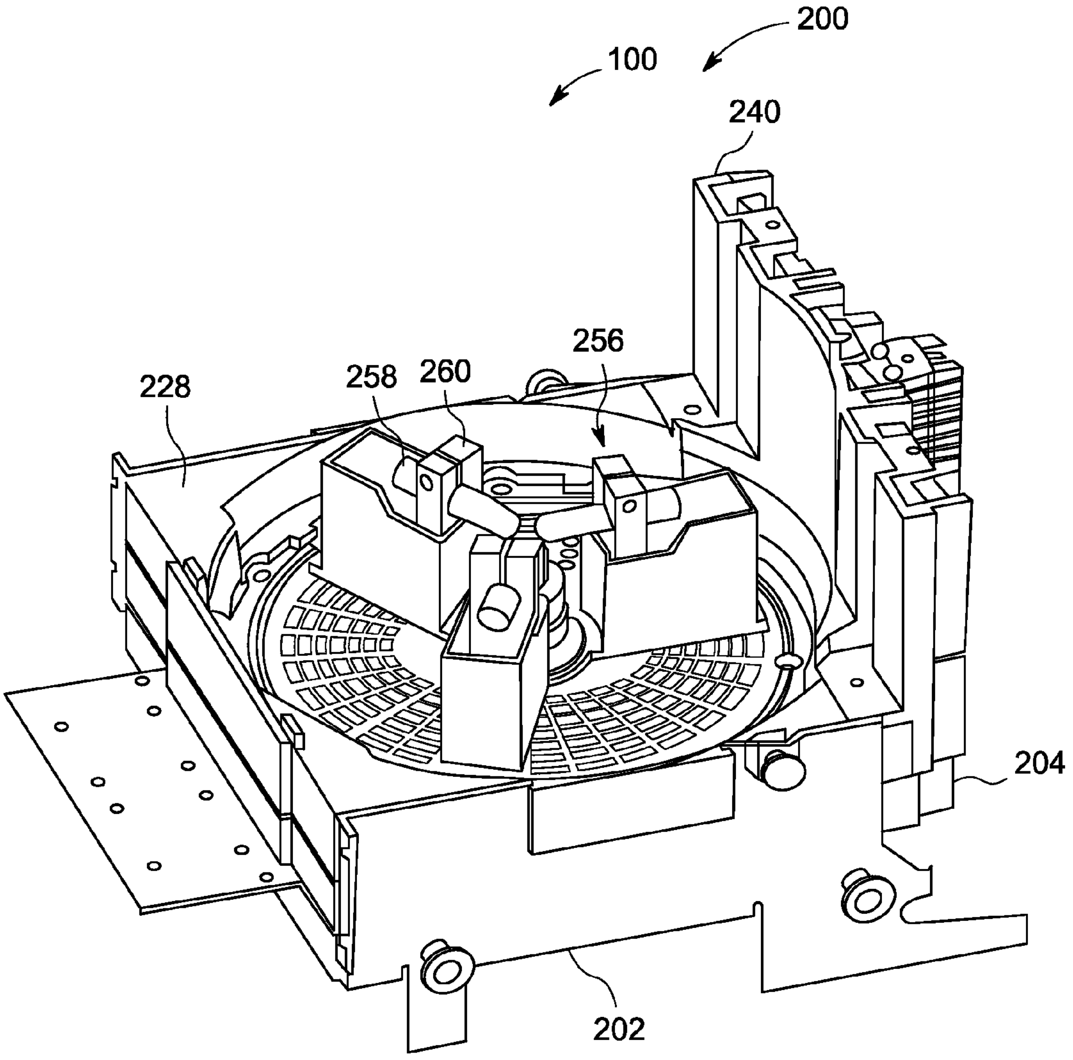
FIG. 2 is a perspective view of an electrical isolation structure that may be used with the circuit protection device shown in FIG. 1.
Figure 3:
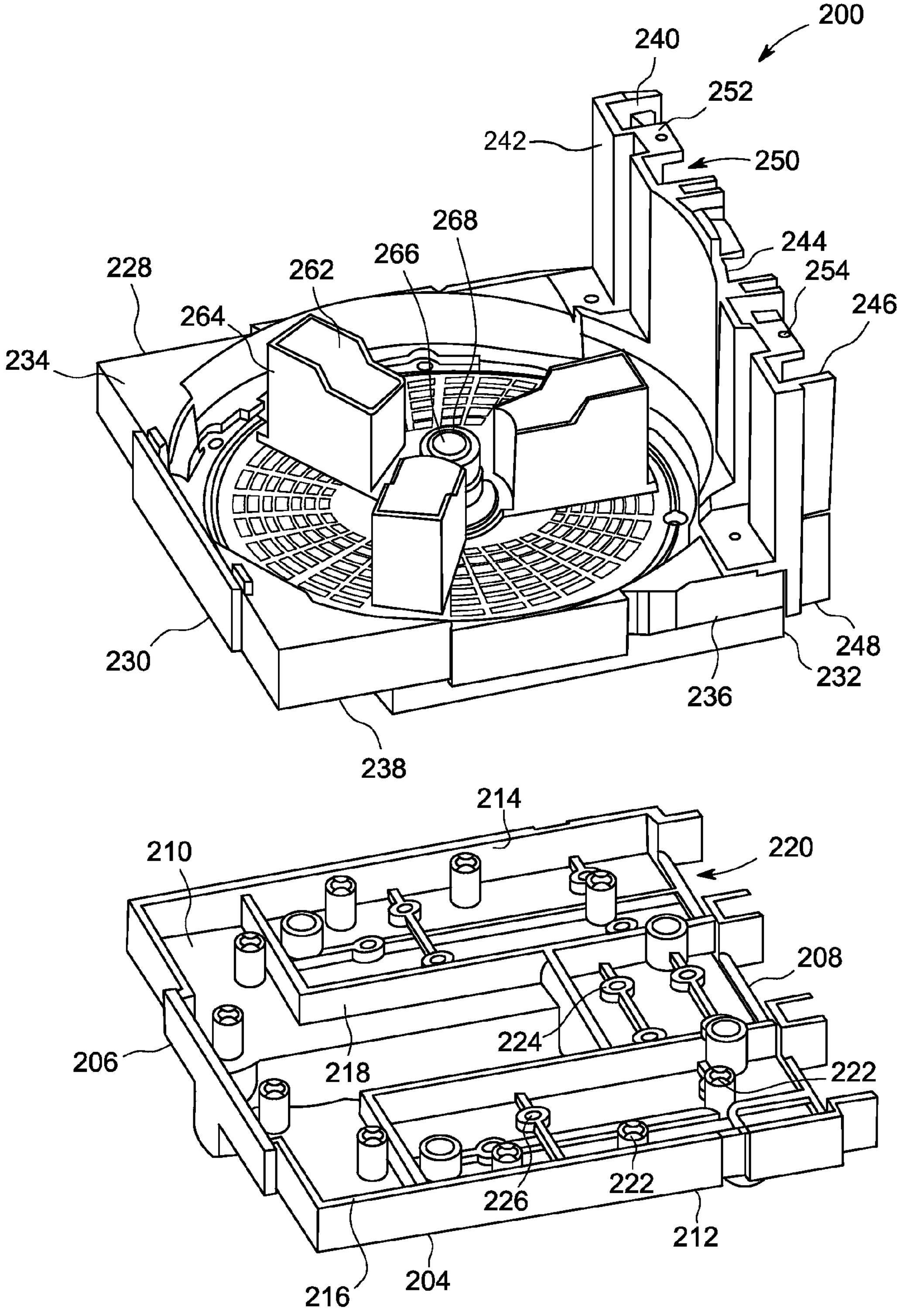
FIG. 3 is a partially exploded view of the electrical isolation structure shown in FIG. 2.
Figure 4:
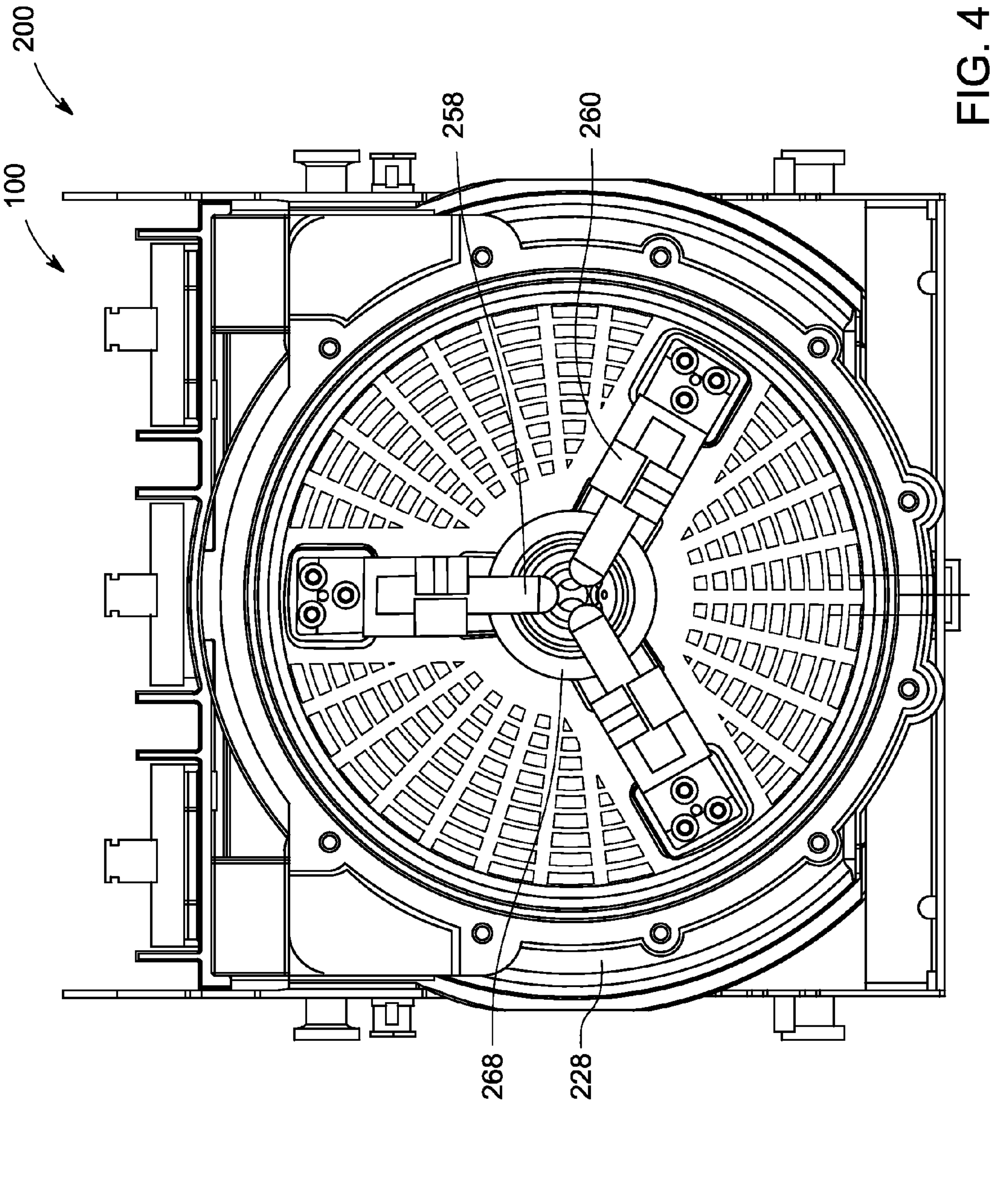
FIG. 4 is a top view of the electrical isolation structure shown in FIGS. 2 and 3.

FIG. 2 is a perspective view of an electrical isolation structure 200 of circuit protection device 100, FIG. 3 is a partially exploded view of electrical isolation structure 200, and FIG. 4 is a top view of electrical isolation structure 200. In the exemplary embodiment, electrical isolation structure 200 includes a base plate 202 that enables circuit protection device 100 to be inserted into an equipment enclosure (not shown) of power distribution equipment (not shown). Moreover, electrical isolation structure 200 includes a conductor base 204 coupled to base plate 202. Conductor base 204 includes a first end 206 and an opposite second end 208. Conductor base 204 also includes a top surface 210 and a bottom surface 212 positioned against base plate 202. A sidewall 214 extends between top surface 210 and bottom surface 212 and includes a top surface 216. Moreover, an interior wall 218 defines a plurality of electrical isolation areas 220 each sized to enable a phase strap (not shown in FIGS. 2 and 3) to be positioned therein and to provide electrical isolation between the phase strap and base plate 202. Each isolation area 220 includes one or more hollow posts 222 sized to receive a coupling mechanism, such as a screw or bolt, therethrough. Moreover, each isolation area 220 includes one or more mounting posts 224 for securing the phase straps to conductor base 204. A mounting aperture 226 extends through each mounting post 224 and is sized to receive a coupling mechanism, such as a screw or bolt, therethrough.

Electrical isolation structure 200 also includes a conductor cover 228 coupled to conductor base 204. Specifically, conductor cover 228 includes a first end 230, an opposite second end 232, a top surface 234, and a sidewall 236 having a bottom surface 238. Conductor cover 228 is coupled to conductor base 204 via a plurality of coupling mechanisms, such as screws or bolts (not shown), that each extends through a respective hollow post 222 and is secured in conductor cover 228. When conductor cover 228 is coupled to conductor base 204, bottom surface 238 is substantially flush with top surface 216. In addition, electrical isolation structure 200 includes a vertical barrier 240 coupled to conductor base 204 and conductor cover 228. Specifically, vertical barrier 240 includes a front surface 242 and an opposite rear surface 244, as well as a top surface 246 and an opposite bottom surface 248. Vertical barrier 240 is coupled to conductor base 204 and conductor cover 228 such that a portion of vertical barrier front surface 242 is positioned in contact with conductor base second end 208 and conductor cover second end 232. Vertical barrier 228 also includes a plurality of recesses 250 that are formed in rear surface 244. Each recess 250 is sized to enable a vertical riser (not shown in FIGS. 2 and 3) to be positioned therein and to provide electrical isolation between the vertical risers. Each recess 250 includes a tongue 252 with an aperture 254 extending therethrough. Apertures 254 are sized to receive a coupling mechanism therethrough to secure a vertical riser within its respective recess 250.

In the exemplary embodiment, circuit protection device 100 also includes a plurality of electrode assemblies 256 that each includes an electrode 258 and an electrode holder 260. Conductor cover 228 includes a plurality of isolation channels 262 that are each sized to house a respective electrode assembly 256 to provide electrical isolation between electrode assemblies 256. Each isolation channel 262 is defined by a plurality of sidewalls 264. Specifically, isolation channels 262 provide electrical isolation between electrode holders 260. Moreover, isolation channels 262 provide electrical isolation between main electrodes 258 and the phase straps that are positioned between conductor cover 228 and conductor base 204. Furthermore, conductor cover 228 includes a plasma gun aperture 266 that is defined by a circular sidewall 268. Plasma gun aperture 266 is sized to enable a plasma gun (not shown) to extend at least partially therethrough along a central axis (not shown) of the plasma gun and plasma gun aperture 266. In the exemplary embodiment, the plasma gun emits an ablative plasma substantially along an axis, such as a central axis of the plasma gun. As shown in FIG. 4, main electrodes 258 are arranged such that each main electrode 258 is symmetrically equidistant from the axis and such that each main electrode 258 is equidistant from each other. For example, a first distance between a first main electrode and a second main electrode is substantially equal to a second distance between the second main electrode and a third main electrode. The first distance is also substantially equal to a third distance between the first main electrode and the third main electrode.

Figure 5:
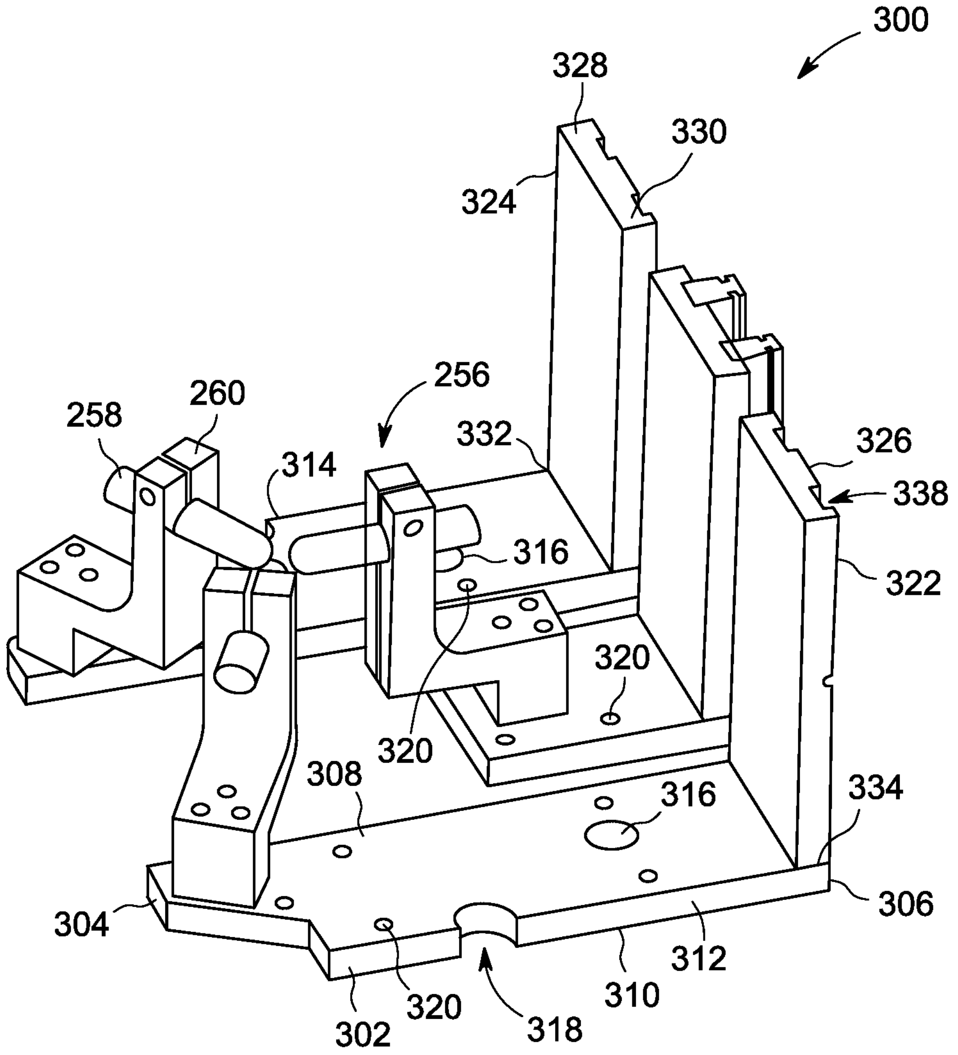
FIG. 5 is a perspective view of a phase electrode assembly that may be used with the circuit protection device shown in FIG. 1.
Figure 6:
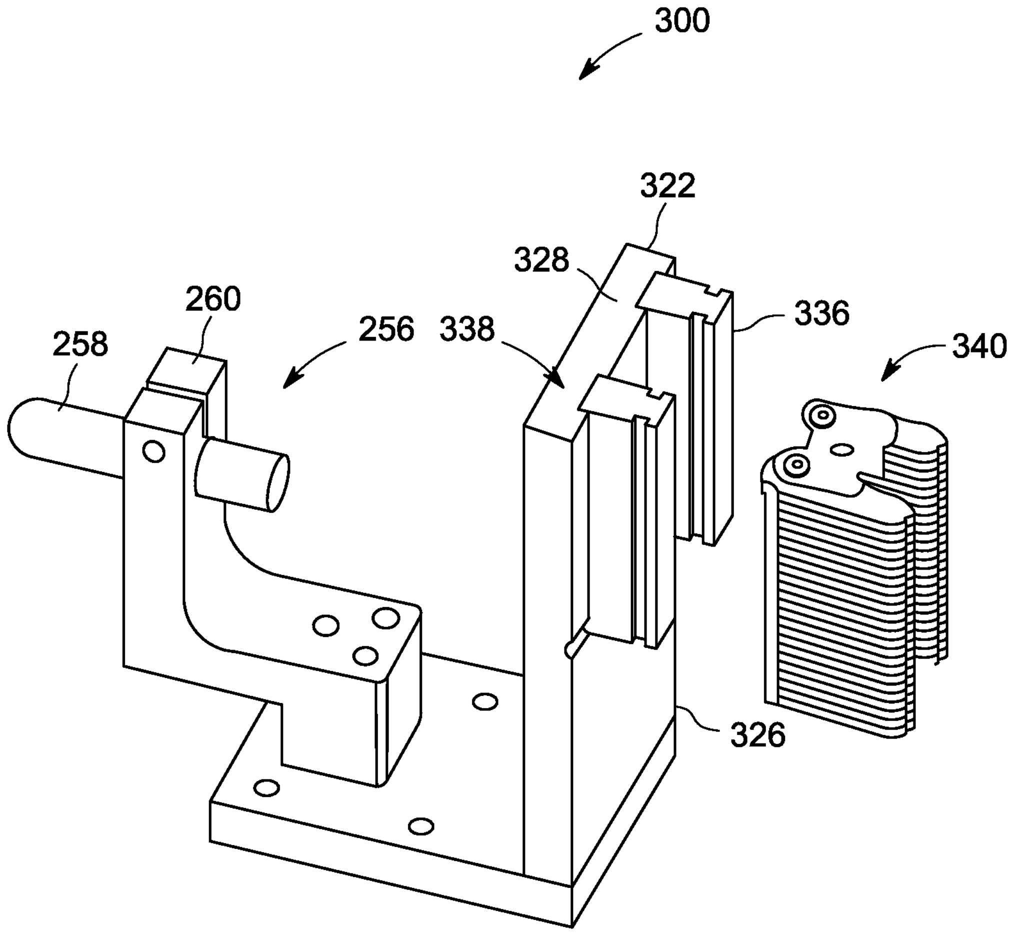
FIG. 6 is an alternate perspective view of the phase electrode assembly shown in FIG. 5.

FIG. 5 is a perspective view of a phase electrode assembly 300 that may be used with circuit protection device 100 (shown in FIG. 1), and FIG. 6 is an alternate perspective view of phase electrode assembly 300. In the exemplary embodiment, phase electrode assembly 300 includes a plurality of electrode assemblies 256. Phase electrode assembly 300 also includes a plurality of phase straps 302. In the exemplary embodiment, each phase strap 302 comprises an electrically conductive material, such as copper. However, any suitably conductive material may be used. Moreover, each phase strap 302 includes a first end 304, an opposite second end 306, a top surface 308, an opposite bottom surface 310, and a plurality of side surfaces including a first side surface 312 and a second side surface 314. Side surfaces 312 and 314 and first end 304 are positioned in contact with or adjacent to interior wall 218 (shown in FIG. 3) of conductor base 204 (shown in FIG. 3) such that interior wall 218 provides electrical isolation between phase straps 302. Phase strap 302 also includes a means for coupling to conductor base 204. For example, one or more phase straps 302 include a hollow post aperture 316 that extends between top surface 308 and bottom surface 310. Hollow post aperture 316 is sized to receive hollow post 222 (shown in FIG. 3) therethrough when conductor cover 228 is coupled to conductor base 204 with phase straps 302 positioned therebetween. Moreover one or more phase straps 302 include a recess 318 that is sized to be positioned against hollow post 222 when conductor cover 228 is coupled to conductor base 204 with phase straps 302 positioned therebetween. Furthermore, one or more phase straps 302 include one or more apertures 320 that are sized to receive a coupling mechanism therethrough to secure phase strap 302 within a respective isolation area 220 of conductor base 204. Each electrode assembly 256 is coupled to a respective phase strap 302 such that electrode holder 260 is positioned substantially flush with phase strap top surface 308 at phase strap first end 304 to facilitate transfer of electrical energy from phase strap 302 to electrode assembly 256. In the exemplary embodiment, conductor base 204 (shown in FIGS. 2 and 3) provides electrical isolation between phase straps 302 and base plate 202 (shown in FIG. 2).

Each phase strap 302 is coupled to a vertical riser 322. In the exemplary embodiment, each vertical riser 322 is composed of an electrically conductive material, such as copper. However, any suitably conductive material may be used. Moreover, each vertical riser 322 includes a front surface 324, an opposite rear surface 326, a top end 328 having a top surface 330, and an opposite bottom end 332 having a bottom surface 334. Vertical riser 322 is coupled to phase strap 302 such that vertical riser bottom surface 334 is positioned substantially flush with phase strap top surface 308 at phase strap second end 306 to facilitate transfer of electrical energy from vertical riser 322 to phase strap 302. In the exemplary embodiment, vertical risers 322 facilitate racking circuit protection device 100 into a bus (not shown) while powered and/or unracking circuit protection device 100 from the bus while powered. In an alternative embodiment, phase electrode assembly 300 does not include vertical risers 322. In such an embodiment, each phase strap 302 is coupled, such as coupled directly in contact with, a bus.

Moreover, as shown in FIG. 6, a cluster support 336 is coupled to rear surface 326 of each vertical riser 322. Specifically, cluster support 336 is coupled to vertical riser 322 within a respective recess 338 that is formed in rear surface 326. In the exemplary embodiment, each cluster support 336 is composed of an electrically conductive material, such as copper. However, any suitably conductive material may be used. Moreover, a spring cluster 340 is coupled, such as removably coupled, to each cluster support 336. Spring cluster 340 provides an electrical connection between conductors of a circuit (neither shown). For example, a phase conductor may be coupled to a first spring cluster to provide electrical energy to a first electrode, a ground conductor may be coupled to a second spring cluster to provide a ground point at a second electrode, and a neutral conductor may be coupled to a third spring cluster. It should be understood that multiple phase conductors may be coupled to respective spring clusters to provide electrical energy at different phases to different electrodes.

Phase electrode assembly 300 enables electrical energy to be transferred from a conductor to a respective main electrode 258 via a current path. In the exemplary embodiment, the current path includes spring cluster 340, cluster support 336, vertical riser 322, phase strap 302, electrode holder 260, and main electrode 258. In an alternative embodiment, phase electrode assembly 300 does not include vertical riser 322, cluster support 336, and/or spring cluster 340. In such an embodiment, the current path includes phase strap 302, electrode holder 260, and electrode 258.

Figure 7:
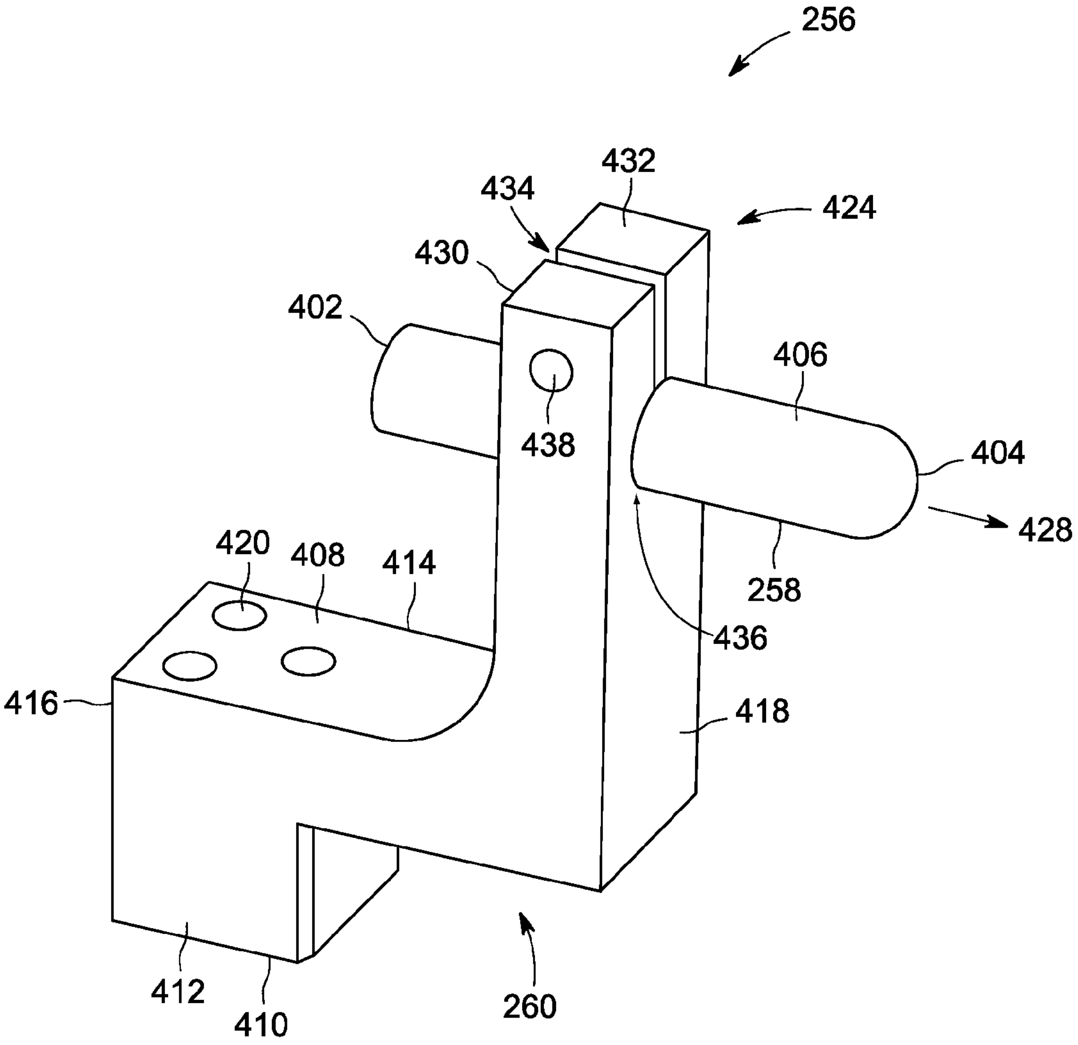
FIG. 7 is a view of an exemplary electrode assembly that may be used with the phase electrode assembly shown in FIGS. 5 and 6.

FIG. 7 is a view of an exemplary adjustable electrode assembly 256 that may be used with phase electrode assembly 300 (shown in FIGS. 4 and 5). In the exemplary embodiment, electrode assembly 256 includes a main electrode 258 that has an elongate shape. Moreover, main electrode 258 has a first end 402 and an opposite second end 404 that define an electrode length therebetween. Second end 404 is substantially hemispherically shaped. Main electrode 258 has a first circumference about an outer surface 406, such that the first circumference is substantially the same for the entire electrode length. In the exemplary embodiment, main electrode 258 is composed of a consumable material such as an alloy of tungsten and steel. However, main electrode 258 may alternatively be composed of any single material or any alloy of multiple materials that enables main electrode 258 to be used to ignite an arc flash within a gap between main electrodes 258. Moreover, main electrode 258 may alternatively be composed of a non-consumable material that enables main electrode 258 to be re-used to ignite an arc flash within a main gap between main electrodes 258.

In the exemplary embodiment, electrode assembly 256 also includes an electrode holder 260 that is composed of an electrically conductive material, such as copper. However, electrode holder 260 may be composed of any other conductive material that also prevents thermal issues between two dissimilar materials, such as between main electrode 258 and electrode holder 260. Electrode holder 260 includes a top surface 408 and an opposite bottom surface 410. Electrode holder 260 also has a plurality of side surfaces, including a first side surface 412, an opposite second side surface 414, a first end surface 416, and an opposite second end surface 418. A plurality of mounting apertures 420 are defined through electrode holder 260 from top surface 408 through bottom surface 410. A coupling mechanism, such as a screw or bolt (not shown), that is sized to be inserted through a corresponding mounting aperture 420 is used to mount electrode holder 260 to phase strap top surface 308 (shown in FIG. 4). Specifically, electrode holder 260 is coupled to phase strap 302 (shown in FIG. 4) such that electrode holder bottom surface 410 is positioned substantially flush with phase strap top surface 308 at phase strap second end 306 (shown in FIG. 4) to facilitate transfer of electrical energy from phase strap 302 to electrode holder 238.

Moreover, each electrode holder 260 is configured to support a respective main electrode 258. For example, each electrode holder 260 includes a clamp portion 424 that secures a respective main electrode 258. More specifically, clamp portion 424 enables a position of main electrode 258 to be adjusted in a first direction 426 to create a larger main gap between main electrodes 258 as shown in FIG. 4, for example. Clamp portion 424 also enables the position of main electrode 258 to be adjusted in a second direction 428 to create a smaller main gap between main electrodes 258. Furthermore, clamp portion 424 enables main electrode 258 to be removed from phase electrode assembly 300 to be repaired and/or replaced. In the exemplary embodiment, clamp portion 424 includes a first portion 430 and a second portion 432 that are separated by a gap 434. Clamp portion 424 also includes an opening 436 that is sized to receive main electrode 258. Opening 436 includes a second circumference that is slightly larger than the first circumference of main electrode 258 to enable the position of main electrode 258 to be adjusted and/or to enable main electrode 258 to be removed from electrode assembly 256. Clamp portion 424 also includes a tightening mechanism 438 that secures main electrode 258 within opening 436. Specifically, tightening mechanism 438 secures main electrode 258 such that electrode outer surface 406 is substantially flush with an inner surface (not shown) of opening 436 to facilitate transfer of electrical energy from electrode holder 260 to main electrode 258. In the exemplary embodiment, tightening mechanism 438 is a screw or bolt (not shown) that extends through first portion 430 into second portion 432. As the screw or bolt is tightened, first portion 430 is forced closer to second portion 432 such that gap 434 becomes smaller and the second circumference of opening 436 becomes smaller, thereby securing main electrode 258 within opening 436. In an alternative embodiment, tightening mechanism 438 is a set screw (not shown) that extends through clamp portion 424, such as through first portion 430, and into opening 436. In such an embodiment, the set screw is tightened directly against electrode outer surface 406 to secure main electrode 258 within opening 436. In some embodiments, electrode 258 is fixed secured within opening 436, such as welded in a specific position within opening 436. In one such embodiment, electrode holder 260 may then be adjusted to position electrode 258 in a desired position with respect to other electrodes 258 and with respect to plasma gun aperture 266 (shown in FIG. 3).

Figure 8:
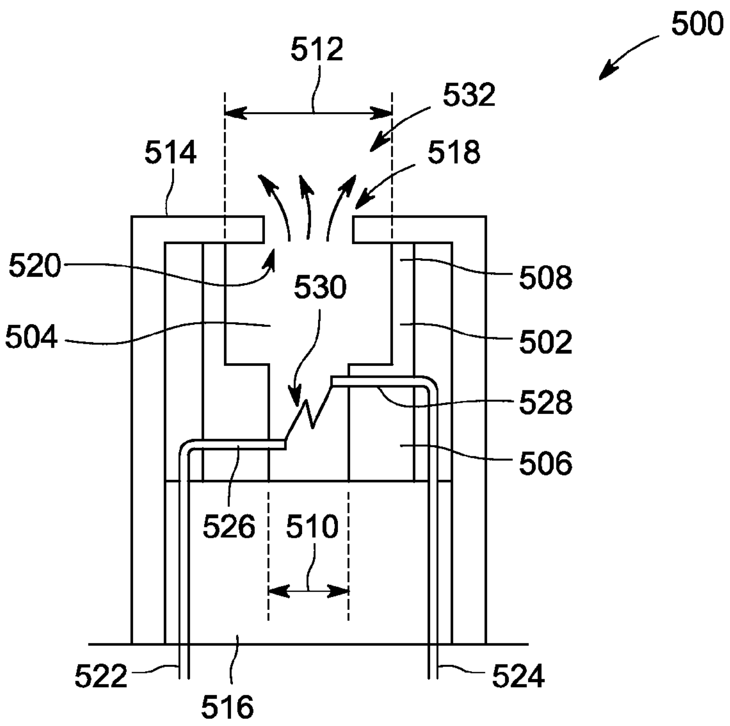
FIG. 8 is a sectional view of an exemplary ablative plasma gun that may be used with the circuit protection device shown in FIG. 1.

FIG. 8 is a sectional view of an exemplary ablative plasma gun 500 for use with circuit protection device 100 (shown in FIG. 1). Plasma gun 500 includes a cup 502 having a chamber 504 formed therein. Cup 502 includes a first portion 506 and a second portion 508 that is positioned with respect to first portion 506 to define chamber 504. For example, in the exemplary embodiment, second portion 508 is positioned above first portion 506. Moreover, first portion 506 has a first diameter 510 that defines a first volume. In the exemplary embodiment, first diameter 510 is approximately 0.138 inches. In addition, second portion 508 has a second diameter 512 that is larger than first diameter 510, wherein second diameter 512 defines a second volume that is similarly larger than the first volume. In the exemplary embodiment, second diameter 512 is approximately 0.221 inches. It should be noted that any suitable measurements may be used for first diameter 510 and/or second diameter 512 that enable plasma gun 500 to function as described herein. Moreover, in the exemplary embodiment, first portion 506 and second portion 508 are integrally formed and chamber 504 is defined therein. In an alternative embodiment, first portion 506 and second portion 508 are separately formed and are coupled together to form chamber 504. In the exemplary embodiment, cup 502 is formed from an ablative material such as Polytetrafluoroethylene, Polyoxymethylene Polyamide, Poly-methyle methacralate (PMMA), other ablative polymers, or various mixtures of these materials.

Moreover, plasma gun 500 includes a cover 514 and a base 516. In the exemplary embodiment, cover 514 is mounted on base 516 and is sized to enclose cup 502. Specifically, cup 502 is positioned between base 516 and cover 514. In addition, a nozzle 518 is formed within cover 514. Nozzle 518 is positioned above an opening 520 of cup 502. In the exemplary embodiment, cover 514 and/or base 516 are formed from the same ablative material as cup 502. Alternatively, cover 514 and/or base 516 are formed from one or more different ablative materials than cup 502, such as a refractory material or a ceramic material.

Furthermore, in the exemplary embodiment, plasma gun 500 includes a plurality of gun electrodes, including a first gun electrode 522 and a second gun electrode 524. First gun electrode 522 includes a first end 526 and second gun electrode 524 includes a second end 528 that each extend into chamber 504. For example, first end 526 and second end 528 enter chamber 504 from radially opposite sides of chamber 504 about a central axis (not shown) of chamber 504. Moreover, first end 526 and second end 528 are diagonally opposed across chamber 504, to define a gap for formation of an arc 530. Electrodes 522 and 524, or at least first end 526 and second end 528, may be formed from, for example, tungsten steel, tungsten, other high temperature refractory metals or alloys, carbon or graphite, or any other suitable materials that enable formation of arc 530. A pulse of electrical potential that is applied between electrodes 522 and 524 creates arc 530 that heats and ablates a portion of the ablative material of cup 502 to create a highly conductive plasma 532 at high pressure. Plasma 532 exits nozzle 518 in a spreading pattern at supersonic speed. Characteristics of plasma 532, such as velocity, ion concentration, and an area of spread, may be controlled by dimensions of electrodes 522 and 524 and/or by a separation distance between first end 526 and second end 528. These characteristics of plasma 532 may also be controlled by the interior dimensions of chamber 504, the type of ablative material used to form cup 502, a trigger pulse shape, and/or a shape of nozzle 518.

During operation, plasma gun 500 and main electrodes 258 (shown in FIG. 2) are coupled to controller 106 (shown in FIG. 1) to form an arc initiation system. In the exemplary embodiment, controller 106 receives signals from one or more sensors (not shown) for use in detecting an arc flash within an equipment enclosure (not shown). The sensor signals may correspond with current measurements through one or more conductors of the circuit, voltage measurements across conductors of the circuit, light measurements in one or more areas of the equipment enclosure, circuit breaker settings or statuses, sensitivity settings, and/or any other suitable sensor signal that indicates an operation status or operating data relating to the power distribution equipment. Controller 106 determines whether an arc flash is occurring or is about to occur based on the sensor signals. If an arc flash is occurring or is about to occur, controller 106 initiates a contained arc flash within containment section 102 (shown in FIG. 1) and transmits a signal to, for example, a circuit breaker, that is electrically coupled to the circuit at risk of the arc flash. In response to the signal, plasma gun 500 emits ablative plasma 532 substantially along an axis between main electrodes 258 to facilitate creation of arc 530. Plasma 532 breaks down the dielectric strength of air in the main gap between main electrodes 258 to provide a lower-impedance path for the current of the arc flash.

Figure 16:
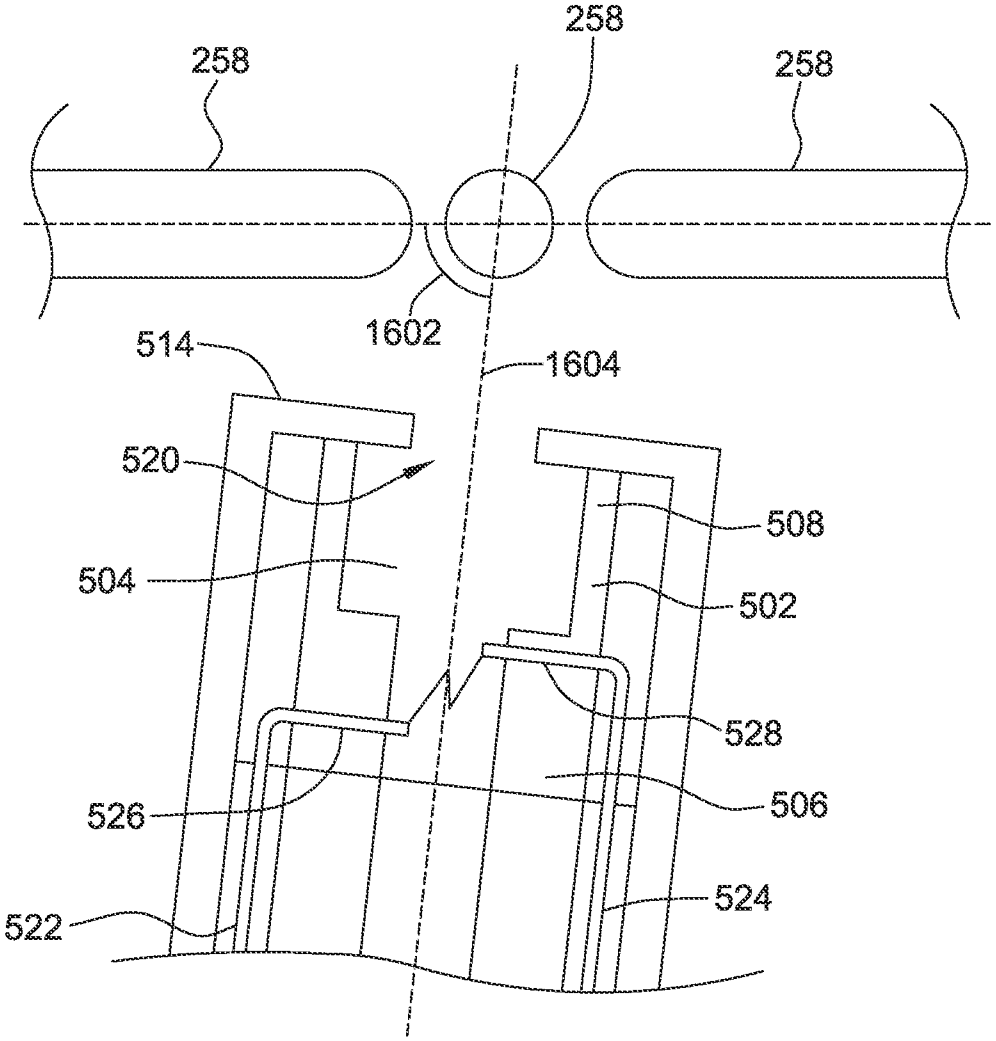
FIG. 16 is a sectional view of the ablative plasma gun shown in FIG. 8 oriented at a non-perpendicular angle relative to a plane defined by the electrodes of the phase electrode assembly of FIG. 5.

Main electrodes 258 are symmetrically and radially positioned about the axis along which the ablative plasma is emitted by plasma gun 500. Moreover, main electrodes 258 are positioned equidistantly in an axial direction from a top surface, or a rim, of plasma gun 500. Specifically, in the exemplary embodiment, main electrodes 258 are positioned approximately 0.1 inch above the top surface of plasma gun 500. However, it should be understood that, main electrodes 258 may be positioned slightly more than approximately 0.1 inch above the top surface of plasma gun 500 or slightly less than approximately 0.1 inch above the top surface of plasma gun 500. Moreover, main electrodes 258 are oriented to define a plane that is substantially perpendicular to the axis and that passes approximately through a center of each main electrode 258. Second end 404 (shown in FIG. 7) of each main electrode 258 is positioned substantially equidistant from the axis along the plane. Furthermore, second end 404 of each main electrode 258 is positioned substantially equidistant from second end 404 of the remaining main electrodes 258. In the exemplary embodiment, second end 404 of each main electrode 258 is positioned a distance of approximately 0.25 inches from second end 404 of the remaining main electrodes 258. In an alternative embodiment, second end 404 of each main electrode 258 is positioned a distance greater than approximately 0.25 inches from second end 404 of the remaining main electrodes 258. In another alternative embodiment, second end 404 of each main electrode 258 is positioned a distance less than approximately 0.25 inches from second end 404 of the remaining main electrodes 258. In an alternative embodiment, plasma gun 500 is adjustable. For example, a height of plasma gun 500 is adjustable relative to the plane defined by main electrodes 258. As another example, shown in FIG. 16, an angle 1602 at which plasma gun 500 is oriented may be adjusted such that the plane defined by main electrodes 258 is not perpendicular to the central axis 1604 of plasma gun 500.

This symmetrical spacing reduces the negative sequence of the current that is transferred from the arc flash into main electrodes 258. Moreover, the structures described herein enable each main electrode 258 to carry substantially the same amount of current. It should be understood that, because each main electrode 258 carries the same current and is positioned the same distance from the other main electrodes 258 and from plasma gun 500, the impedance between a tip of each main electrode 258 and the central axis of plasma gun 500 is also substantially the same. Arc 530 is contained within containment section 102, which enables the excess energy to be removed from the circuit to protect the circuit and any power distribution equipment.

Furthermore, the hemispherical shape of second end 404 of each main electrode 258 facilitates preventing self-breakdown of main electrodes 258. Accordingly, main electrodes 258 can be positioned by gauging the horizontal and/or vertical position of each main electrode 258 in comparison to one or more national and/or international standards. For example, main electrodes 258 can be positioned such that each main electrode 258 is equidistant from the central axis of plasma gun 400 and such that main electrodes 258 are equidistant from each other based on a voltage across a plurality of conductors within an electrical circuit being monitored by circuit protection device 100. Moreover, main electrodes 258 are positioned such that second end 404 of each main electrode 258 is enveloped by the ablative plasma emitted by plasma gun 400.

Figure 9:
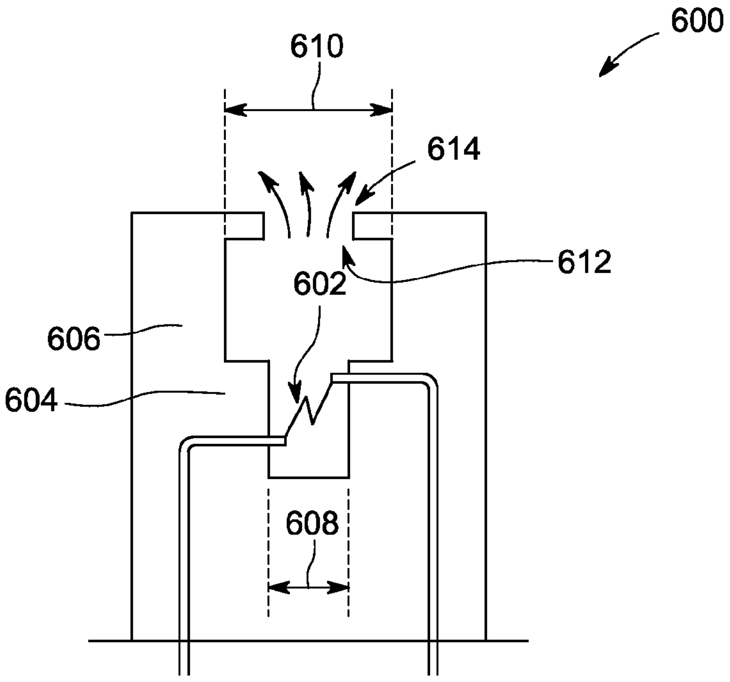
FIG. 9 is a sectional view of an alternative embodiment of a plasma gun that may be used with the circuit protection device shown in FIG. 1.

FIG. 9 is a sectional view of an alternative embodiment of an ablative plasma gun 600. As shown in FIG. 9, plasma gun 600 is integrally formed from a single ablative material. Plasma gun 600 includes a chamber 602 that is defined by a first portion 604 and a second portion 606, which is positioned above first portion 604 and is integrally formed with first portion 604. Moreover, first portion 604 has a first diameter 608 and second portion 606 has a second diameter 610. In the exemplary embodiment of FIG. 9, second diameter 610 is larger than first diameter 608. Moreover, as shown in FIG. 9, chamber 602 includes an opening 612 that partially extends across second portion 606 to form a nozzle 614.

Figure 10:
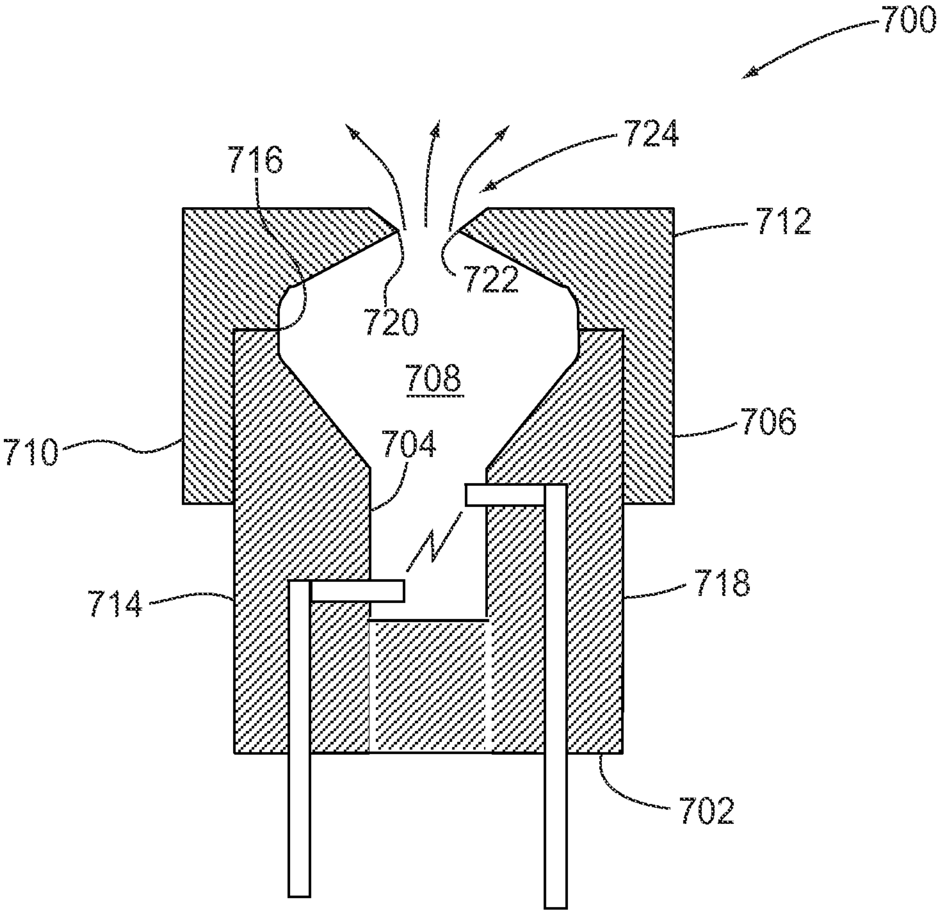
FIG. 10 is a sectional view of another alternative embodiment of a plasma gun that may be used with the circuit protection device shown in FIG. 1.

FIG. 10 is a sectional view of another alternative embodiment of an ablative plasma gun 700. As shown in FIG. 10, plasma gun 700 includes a base 702 that has a cup 704 formed therein. A cover 706 is coupled to base 702 to define a chamber 708. Cover 706 includes a first portion 710 and a second portion 712. First portion 710 is coupled to a first side 714 of base 702 and extends along a top edge 716 of base 702. Similarly, second portion 712 is coupled to a second side 718 of base 702 and extends along top edge 716. A gap is defined between inner edges 720 and 722 of first portion 710 and second portion 712, respectively, to form a nozzle 724.

Figure 11:
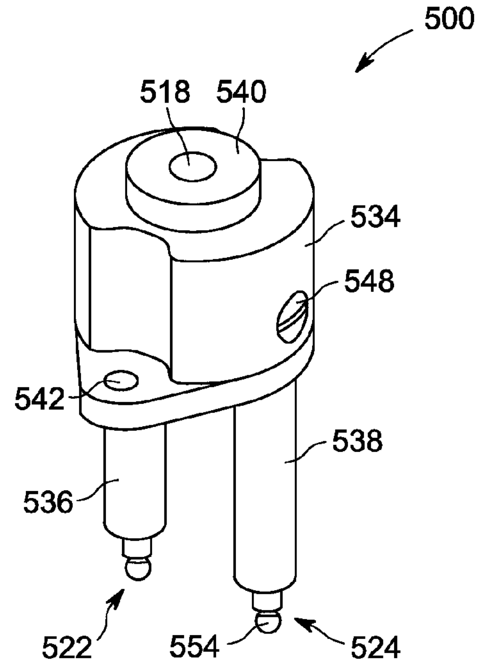
FIG. 11 is a perspective view of the plasma gun shown in FIG. 8.
Figure 12:
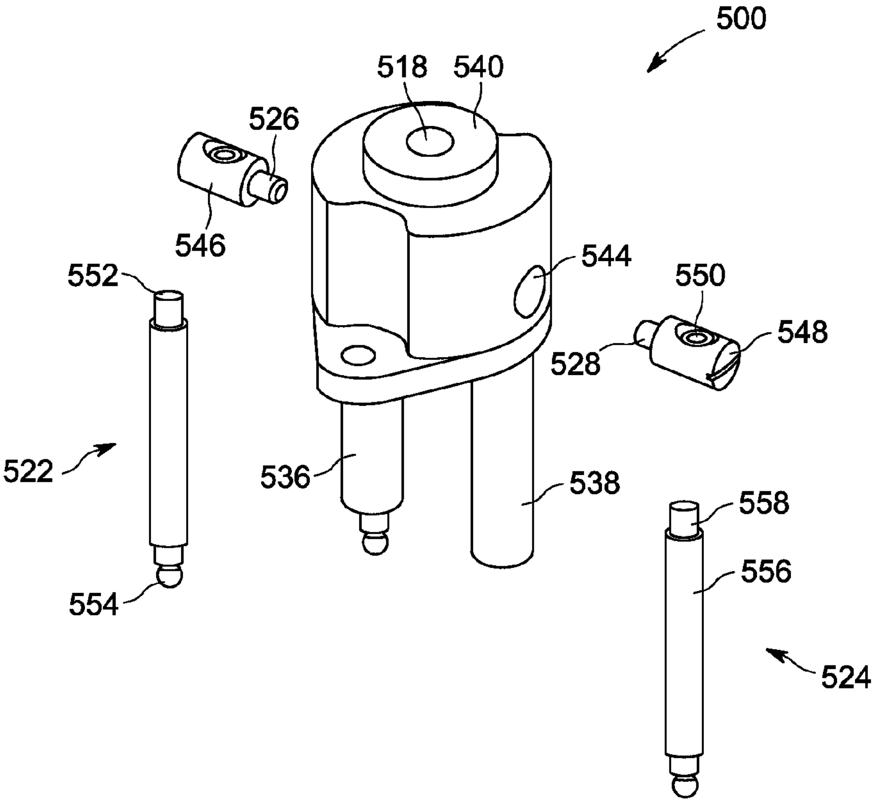
FIG. 12 is an exploded view of the plasma gun shown in FIG. 11.

FIG. 11 is a perspective view of plasma gun 500, and FIG. 12 is an exploded view of plasma gun 500. In the exemplary embodiment, plasma gun 500 includes a main body portion 534, a first hollow leg 536, and a second hollow leg 538. A rim 540 is provided across at least a portion of main body portion 534. Nozzle 518 extends through rim 540 into chamber 502 (shown in FIG. 8). Moreover, main body portion 534 includes at least one mounting aperture 542 that facilitates securing plasma gun 500 within plasma gun aperture 266.

A gun electrode aperture 544 extends through main body portion 534, and is sized to a gun electrode body therein. Specifically, first end 526 of a first gun electrode body 546 is inserted into gun electrode aperture 544 in a first direction such that first end 526 extends at least partially into chamber 502. Similarly, second end 528 of a second gun electrode body 548 is inserted into gun electrode aperture 544 in a second direction such that second end 528 extends at least partially into chamber 502 and opposes first end 526 across chamber 502. Each gun electrode body 546 and 548 includes a post aperture 550 extending therethrough.

First hollow leg 536 and second hollow leg 538 are coupled to main body portion 534, and are each sized to receive a respective wire electrode therein. For example, first hollow leg 536 is sized to receive first wire electrode 522 therein, and second hollow leg 538 is sized to receive second wire electrode 524 therein. Each wire electrode 522 and 524 includes a top end 552 and an opposite bottom end 554 with a body 556 extending therebetween. Top end 552 defines a post 558 that is sized to be inserted into post aperture 550 of a respective gun electrode body 546 and 548. Bottom end 554 is substantially hemispherical in shape for insertion into an electrical connector (not shown in FIGS. 11 and 12).

Figure 13:
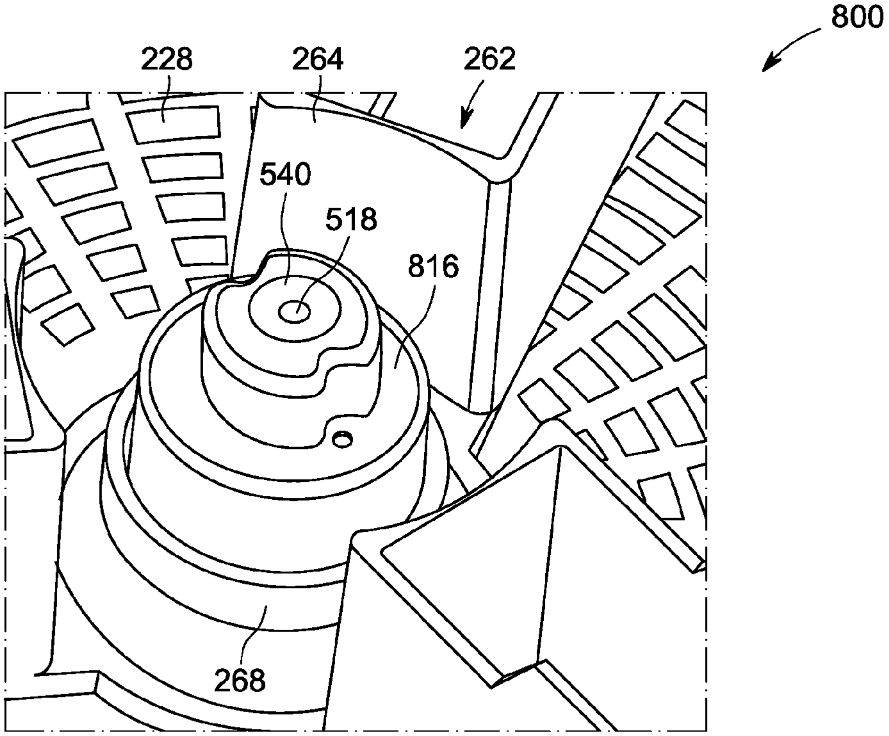
FIG. 13 is a perspective view of an exemplary plasma gun assembly that may be used with the circuit protection device shown in FIG. 1.
Figure 14:
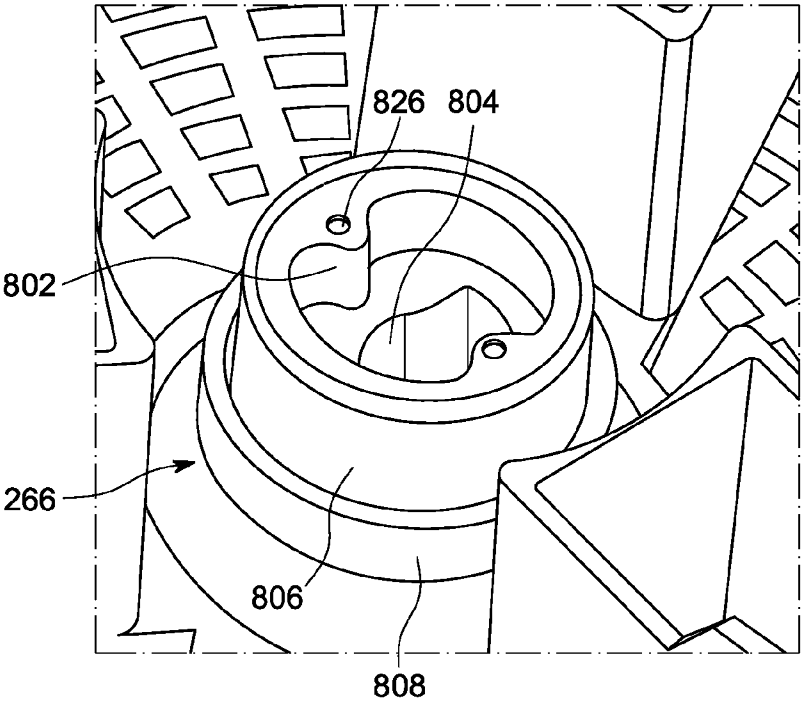
FIG. 14 is a perspective view of an exemplary plasma gun aperture that may be used with the plasma gun assembly shown in FIG. 13.
Figure 15:
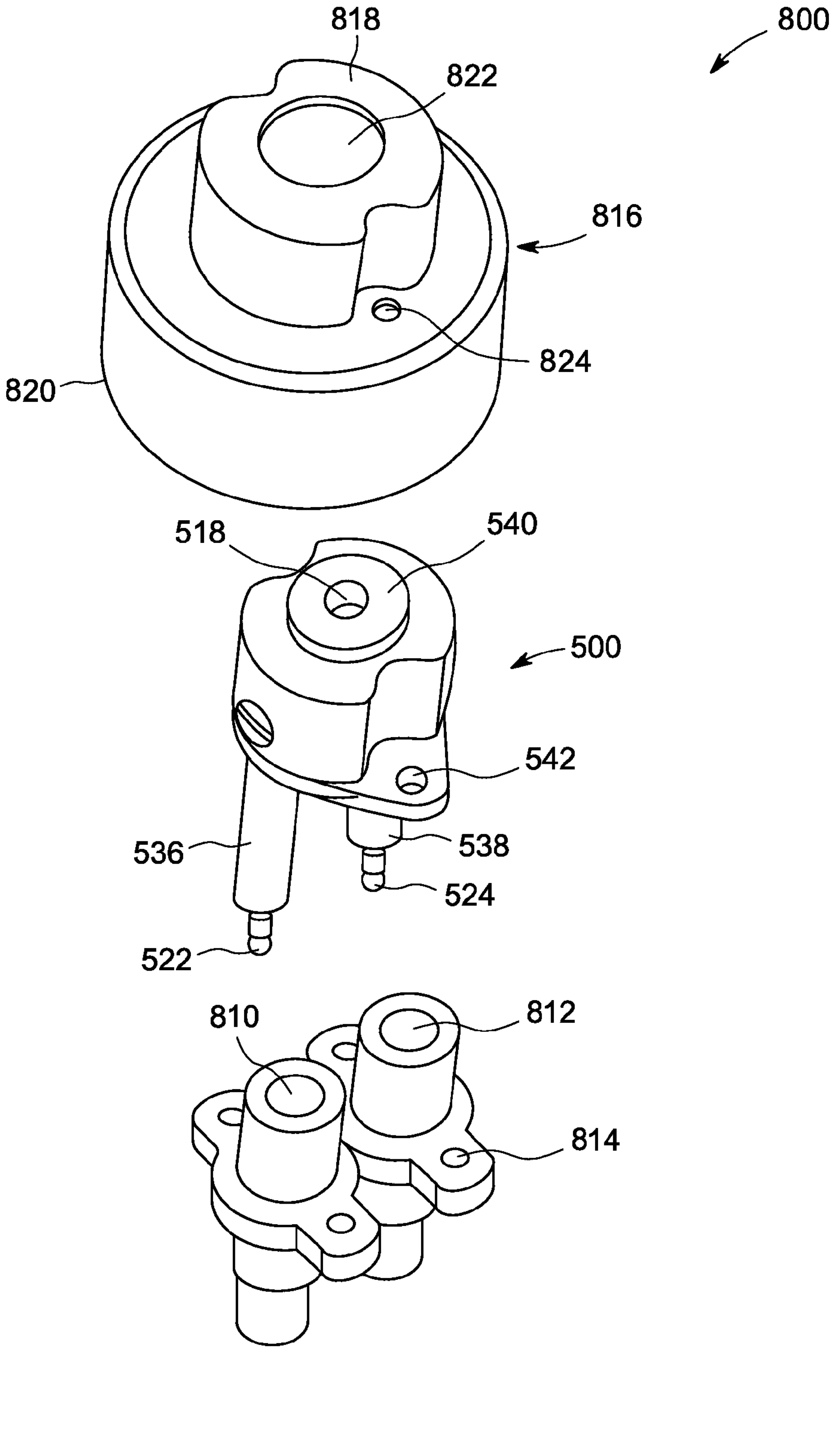
FIG. 15 is an exploded view of the plasma gun assembly shown in FIG. 14.

FIG. 13 is a perspective view of a plasma gun assembly 800, FIG. 14 is a perspective view of plasma gun aperture 266 of conductor cover 228, and FIG. 15 is an exploded view of plasma gun assembly 800. Notably, any of plasma guns 500, 600, and 700 can be used with plasma gun assembly 800. In the exemplary embodiment, plasma gun 500 extends at least partially through plasma gun aperture 266. Plasma gun aperture 266 includes a first opening 802 and a second opening 804. Plasma gun aperture 266 also includes an inner wall 806 and an outer wall 808 that are separated by a gap.

First opening 802 is sized to enable first hollow leg 536 to extend through conductor cover 228 to be connected to a first plasma gun connector 810. Similarly, second opening 804 is sized to enable second hollow leg 538 to extend through conductor cover 228 to be connected to a second plasma gun connector 812. Specifically, wire electrode second ends 554 (shown in FIG. 12) are inserted into first plasma gun connector 810 and second plasma gun connector 812, respectively. Plasma gun connectors 810 and 812 provide an electrical connection between wire electrodes 522 and 524 and a firing circuit (not shown). Moreover, plasma gun connectors 810 and 812 enable plasma gun 500 to be removed from plasma gun assembly 800. Plasma gun connectors 810 and 812 include at least one mounting aperture 814 that is positioned underneath mounting aperture 542 of plasma gun main body portion 534.

Plasma gun assembly 800 also includes a plasma gun cover 816 that is sized to cover plasma gun 500. Cover 816 includes a top portion 818 and a lower portion 820. Top portion 818 is substantially the same shape of plasma gun main body portion 534. Moreover, top portion 818 a central aperture 822 that is sized to enable rim 540 to extend at least partially therethrough. In the exemplary embodiment, lower portion 820 is integrally formed with top portion 818. Moreover, lower portion 820 has a thickness that is substantially the same as the width of the gap between inner wall 806 and outer wall 808. Lower portion 820 also has a diameter that is between a diameter of inner wall 806 and a diameter of outer wall 808. In addition, lower portion 820 includes a mounting aperture 824 that is positioned to overlay mounting aperture 542 of plasma gun main body portion 534. A pin or similar fastening mechanism extends through mounting apertures 814, 542, and 824, and is secured within a mounting aperture 826 provided in inner wall 806 to facilitate securing cover 816 and plasma gun 500.

Exemplary embodiments of apparatus for use in devices for protection of power distribution equipment are described above in detail. The apparatus are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

Although the present invention is described in connection with an exemplary power distribution environment, embodiments of the invention are operational with numerous other general purpose or special purpose power distribution environments or configurations. The power distribution environment is not intended to suggest any limitation as to the scope of use or functionality of any aspect of the invention. Moreover, the power distribution environment should not be interpreted as having any dependency or requirement relating to any one or combination of components illustrated in the exemplary operating environment.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A circuit protection device comprising:

a plasma gun configured to emit an ablative plasma along an axis, said plasma gun comprising a first portion and a second portion cooperatively defining an interior chamber of the plasma gun, said first portion defining a first volume of the chamber and said second portion defining a second volume of the chamber that is larger than the first volume; and a plurality of electrodes, each electrode of said plurality of electrodes electrically coupled to a respective conductor of a circuit, said plurality of electrodes arranged substantially along a plane that is substantially perpendicular to the axis such that each said electrode is positioned substantially equidistant from the axis.

2. A circuit protection device in accordance with claim 1, wherein said plurality of electrodes are substantially equidistant from each other along the plane.

3. A circuit protection device in accordance with claim 1, further comprising a plurality of electrode holders, each electrode holder of said plurality of electrode holders configured to support a respective electrode of said plurality of electrodes such that a position of a respective said electrode is adjustable in a radial direction with respect to the axis.

4. A circuit protection device in accordance with claim 1, wherein said first portion has a first diameter, and said second portion has a second diameter that is larger than said first diameter.

5. A circuit protection device in accordance with claim 1, wherein said plasma gun comprises a base and a cover coupled to said base, said cover defines a nozzle providing fluid communication between the chamber and an exterior of said plasma gun, and each of said plurality of electrodes is positioned substantially axially equidistant from said nozzle.

6. A circuit protection device in accordance with claim 1, wherein each of said plurality of electrodes comprises a first end and a second end with a body defined therebetween, and wherein said second end is hemispherically shaped.

7. A circuit protection device in accordance with claim 1, wherein said plasma gun is oriented at an angle relative to the plane defined by said plurality of electrodes, wherein a position of said plasma gun is adjustable such that the angle at which said plasma gun is oriented may be adjusted.

8. An arc initiation system for use with a circuit protection device, said arc initiation system comprising:

a controller configured to detect an arc event in a circuit and initiate an arc within the circuit protection device;

a plasma gun operatively coupled to said controller, said plasma gun configured to emit an ablative plasma along an axis, said plasma gun comprising a first portion and a second portion cooperatively defining an interior chamber of the plasma gun, said first portion defining a first volume of the chamber and said second portion defining a second volume of the chamber that is larger than the first volume; and a plurality of electrodes, each electrode of said plurality of electrodes electrically coupled to a respective conductor of the circuit, said plurality of electrodes arranged substantially along a plane that is substantially perpendicular to the axis such that said electrodes are substantially equidistant from each other.

9. An arc initiation system in accordance with claim 8, wherein a respective distance between each of said plurality of electrodes defines a gap sized to receive the ablative plasma from said plasma gun.

10. An arc initiation system in accordance with claim 9, wherein each of said plurality of electrodes is configured to carry an approximately equal amount of current.

11. An arc initiation system in accordance with claim 8, further comprising a plurality of electrode holders, each electrode holder of said plurality of electrode holders configured to support a respective electrode such that a position of said respective electrode is adjustable in a radial direction with respect to the axis.

12. An arc initiation system in accordance with claim 8, wherein said first portion has a first diameter, and said second portion has a second diameter that is larger than said first diameter, and wherein said plasma gun defines a nozzle providing fluid communication between the chamber and an exterior of said plasma gun, and each of said plurality of electrodes is positioned substantially axially equidistant from said nozzle.

13. An arc initiation system in accordance with claim 12, wherein an axial distance between said nozzle and said plurality of electrodes is adjustable.

14. An arc initiation system in accordance with claim 8, wherein said plasma gun comprises a base and a cover coupled to said base, said cover defines a nozzle providing fluid communication between the chamber and an exterior of said plasma gun, and each of said plurality of electrodes is positioned substantially axially equidistant from said nozzle.

15. An arc initiation system in accordance with claim 8, wherein each of said plurality of electrodes is positioned along the plane substantially equidistant from the axis.

16. A method of assembling a circuit protection device, said method comprising:

coupling each of a plurality of electrodes to a different portion of an electrical circuit;

positioning an ablative plasma gun that is configured to emit an ablative plasma along an axis, wherein the ablative plasma gun includes a first portion and a second portion cooperatively defining an interior chamber of the plasma gun, the first portion defining a first volume of the chamber and the second portion defining a second volume of the chamber that is larger than the first volume; and adjusting a position of each of the plurality of electrodes in one of a first direction and an opposite second direction along a plane that is substantially perpendicular to the axis such that each electrode of the plurality of electrodes is positioned substantially equidistant from the axis.

17. A method in accordance with claim 16, wherein adjusting a position of each of the electrodes comprises:

inserting a first electrode into a first opening formed in a first electrode holder;

inserting a second electrode into a second opening formed in a second electrode holder;

inserting a third electrode into a third opening formed in a third electrode holder;

adjusting the position of each electrode within the respective opening in one of the first direction and the second direction until each electrode is approximately equidistant from the axis; and securing each electrode within the respective opening.

18. A method in accordance with claim 16, wherein adjusting a position of each of the electrodes comprises adjusting the position of each of the electrodes such that each of the electrodes is positioned substantially axially equidistant from a nozzle formed in the plasma gun.

19. A method in accordance with claim 16, wherein adjusting a position of each of the electrodes comprises adjusting the position of each of the electrodes according to a voltage across a plurality of conductors of the electrical circuit.

20. A method in accordance with claim 16, wherein adjusting a position of each of the electrodes comprises gauging the position of each of the electrodes to facilitate envelopment of a tip of each of the electrodes by the ablative plasma emitted by the plasma gun.

* * * * *